(12) United States Patent
Wang (10) Patent No.: US 6,718,067 B1
(45) Date of Patent: Apr. 6, 2004

(54) METHOD OF MANIPULATING ILLUMINATION EFFECTS ASSOCIATED WITH AN IMAGE

(75) Inventor: Lizhi Wang, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/364,688

(22) Filed: Jul. 30, 1999

(51) Int. Cl.$^7$ ................................................ G06K 9/40
(52) U.S. Cl. ........................ 382/254; 382/260; 382/261; 358/475
(58) Field of Search ................................ 382/254, 117, 382/170, 284, 260, 165, 210, 261, 262, 263, 264, 265; 358/475, 509, 1.9–3.31, 447, 461, 463

(56) References Cited

U.S. PATENT DOCUMENTS

| | | | | |
|---|---|---|---|---|
| 4,082,431 A | * | 4/1978 | Ward, III | 359/15 |
| 4,649,568 A | * | 3/1987 | Kiesel et al. | 382/162 |
| 5,734,747 A | * | 3/1998 | Vaidyanathan | 382/170 |
| 5,956,427 A | * | 9/1999 | Greenspan et al. | 382/240 |
| 6,084,221 A | * | 7/2000 | Rhoads | 250/201.9 |
| 6,088,470 A | * | 7/2000 | Camus et al. | 382/117 |
| 6,256,409 B1 | * | 7/2001 | Wang | 382/170 |
| 6,445,834 B1 | * | 9/2002 | Rising, III | 382/305 |
| 2001/0038718 A1 | * | 11/2001 | Kumar et al. | 382/284 |

OTHER PUBLICATIONS

William Tafel Freeman, "Steerable Filters and Local Analysis of Image Structure", Jun. 1992, Massachussetts Institute of Technology, Media Arts and Sciences Section.*

W.T. Freeman et al. "The Design and Use of Steerable Filters", IEEE Transactions on Pattern Analysis and Machine Intelligence, Sep. 1991, pp 891–906, vol. 15, issue 9.*

W.T. Freeman et al., "Steerable Filters for Early Vision, Image Analysis, and Wavelet Decomposition", International Conference on Computer Vision, 1990, pp 406–415.*

Bharath, A.A., "Steerable filters for multirate shape extraction", Feb. 29, 2000, Time Scale and Time Frequency Analysis and Applications, Ref. No. 2000/019, pp. 17/1–17/6.*

Ramamurthi, B., Gersho, A., "Edge–oriented filtering of images with application to post–processing of vector quantized images", Accoustics, Speech, and Signal Processing, IEEE International Conference on ICASSP, Mar. 1984, vol. 9, pp. 573–576.*

* cited by examiner

Primary Examiner—Kimberly A. Williams
Assistant Examiner—Melanie Vida
(74) Attorney, Agent, or Firm—Blakely, Sokoloff, Taylor & Zafman LLP (57) ABSTRACT

A method of manipulating illumination effects associated with an image. Initially, image data is filtered to provide orientation data and energy-data for a base image and an illuminated base image, the illuminated base image being a illuminated variation of the base image. Next, an illumination function is generated based upon illumination difference between the filtered base image and the filtered illuminated base image, the energy data of the filtered illuminated base image being related to the energy data of the filtered base image by the illumination function. Then the energy data of the filtered base image is normalized using the primary energy data of the filtered base image, and the energy data of the filtered illuminated base image is normalized using the primary energy data of the filtered illuminated base image.

21 Claims, 4 Drawing Sheets

METHOD OF MANIPULATING ILLUMINATION EFFECTS ASSOCIATED WITH AN IMAGE

FIELD OF THE INVENTION

The present invention relates to image descriptors and image processing. More specifically, the present invention relates to manipulating illumination effects associated with an image.

BACKGROUND

Image processing allows for the comparison of a reference image against another image or multiple images in order to determine a "match" or correlation between the respective images. Accordingly, a variety of different image matching techniques have been employed to determine such a match or correlation between images.

One such image matching technique is known as object classification. The object classification technique operates by segmenting the original image into a series of discrete objects which are then measured using a variety of shape measurement identifications, such as shape dimensions and statistics, to identify each discrete object. Accordingly, each of the discrete objects are then classified into different categories by comparing the shape measurement identifications associated with each of the discrete objects against known shape measurement identifications of known reference objects. As such, the shape measurement identifications associated with each of the discrete objects are compared against known shape measurement identifications of known reference objects in order to determine a correlation or match between the images.

Another image matching technique used for determining a match between images is a process known as match filtering. Match filtering utilizes a pixel-by-pixel or image mask comparison of an area of interest associated with the proffered image against a corresponding area of interest contained in the reference image. Accordingly, provided the area of interest associated with the proffered image matches the corresponding area of interest of the reference image, via comparison, an area or pixel match between the images is accomplished and the images are considered to match.

Yet another image matching technique utilizes a series of textual descriptors which are associated with different reference images. The textual descriptors describe the image with textual descriptions, such as shape (e.g., round), color (e.g., green), and item (e.g., ball). Accordingly, when a proffered image is received for comparison, the textual descriptor of the proffered image is compared against the textual descriptors associated with the reference image(s). As such, the textual descriptor associated with the respective images under comparison are compared to each other in order to determine the best match between the textual descriptions associated with each image, and therefore a match between the respective images.

A common problem that may occur in such image matching techniques is the "mismatching" of images, based upon different illuminations or illumination effects that act on the objects to generate different illumination effects in the images, that are being compared to each other. For instance, one common physical image may have different illumination effects acting on or associated with the physical image, thereby creating different illuminated variations or versions of the common physical image. Accordingly, the different illuminated variations or versions of the common physical image may be mistakenly interpreted as being different physical images based upon the different illumination effects acting on or associated with the common physical image. As such, even though illuminated variations or versions of the common physical image are of the same physical image, the variations or versions of the same common physical image may be interpreted as different physical images due to the different illumination or illumination effects acting on or associated with the common physical image.

It is therefore desirable to provide a technique wherein the effects of illumination effects, which act upon or are associated with the objects in images under comparison, are effectively reduced or eliminated, so as to alleviate the problem of improperly interpreting illuminated variations of a common physical image as different distinct physical images.

SUMMARY OF THE INVENTION

A method of manipulating illumination effects associated with an image. Initially, image data is filtered to provide orientation data and energy data for a base image and an illuminated base image, the illuminated base image being a illuminated variation of the base image. Next, an illumination function is generated based upon illumination difference between the filtered base image and the filtered illuminated base image, the energy data of the filtered illuminated base image being related to the energy data of the filtered base image by the illumination function. Then the energy data of the filtered base image is normalized using the primary energy data of the filtered base image, and the energy data of the filtered illuminated base image is normalized using the primary energy data of the filtered illuminated base image.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

In one embodiment, steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention relates to a method or technique used to manipulate illumination effects associated with an image in order to alleviate or eliminate the problem of improperly interpreting illuminated variations of a common physical image as two different physical images.

Figure 1A:
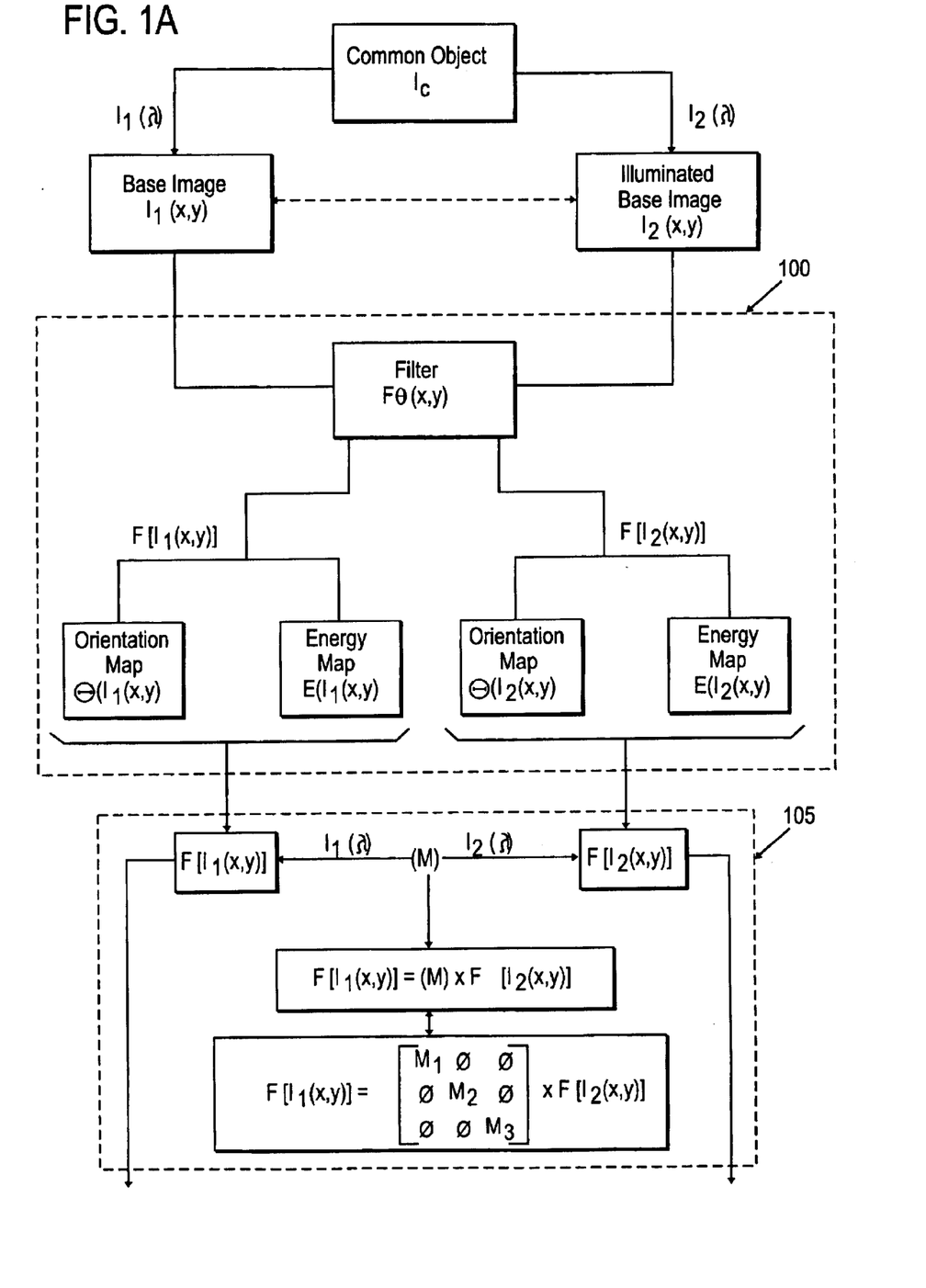
FIGS. 1A and 1B illustrate, in block flow diagram format, an embodiment of a method for manipulating illumination effects associated with an image in accordance with the teachings of one embodiment of the present invention.
Figure 1B:
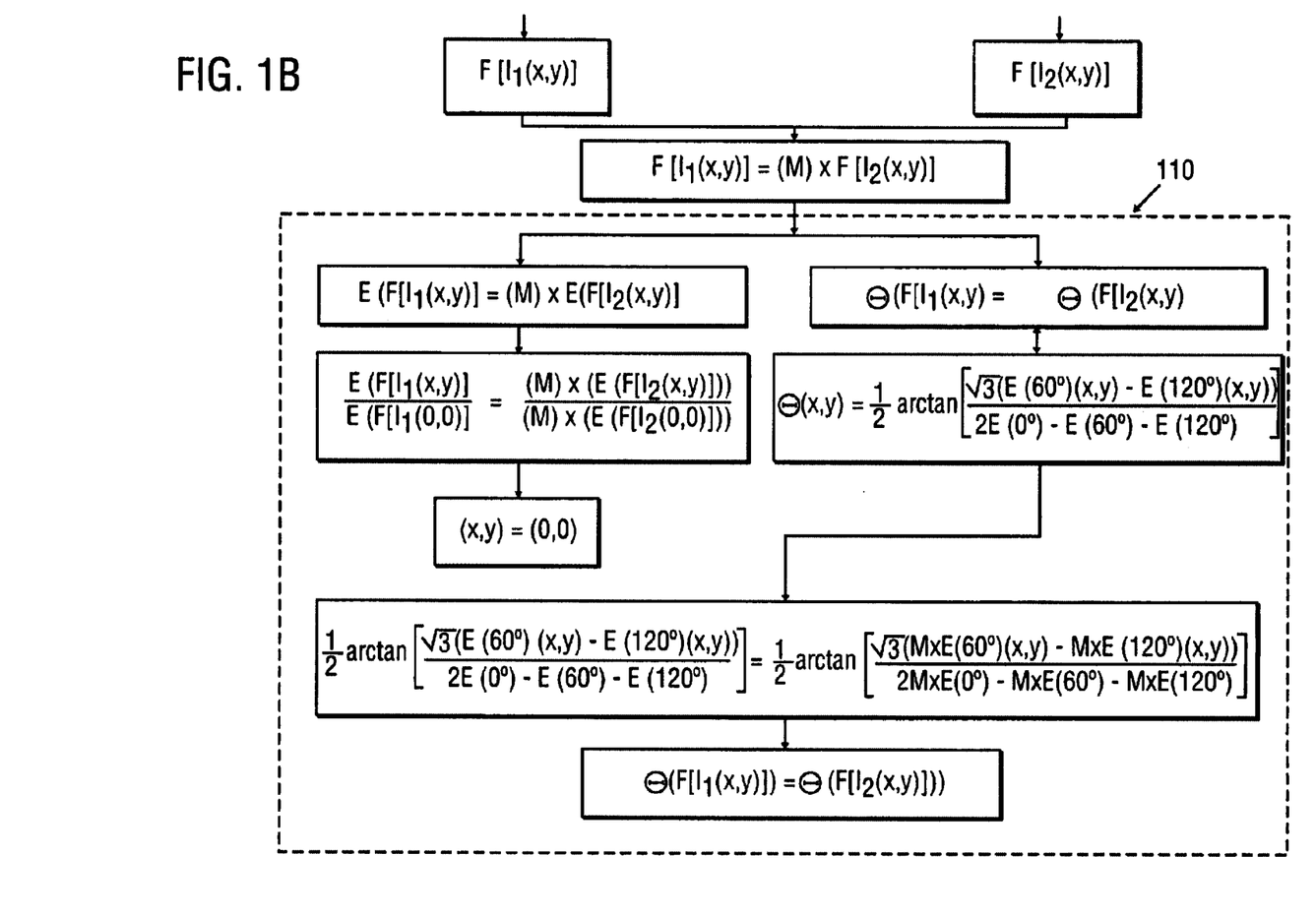

FIG. 1 illustrates, in block flow diagram format, an embodiment of a method for manipulating illumination effects associated with an image.

In one embodiment, an image of a common object or surface of an object (Ic) illuminated by a spectral distribution I1(λ) is represented as a first image or base image [I1(x,y)]. Similarly, an image of the object or surface (Ic) illuminated by a different spectral distribution I2(λ) is represented as a second or illuminated base image [I2(x,y)]. As such, the illuminated base image [I2(x,y)] is an illuminated variation of the base image [I1(x,y)] due to the different illumination or illumination effects (e.g., I1(λ) and I2(λ)) acting on or associated with the common image or image surface (Ic).

Image features that correspond to the respective images, [I1(x,y)] and [I2(x,y)], may be extracted from the respective images by the application of the respective images to spatial filters. The application of multi-band images to spatial filters enables the construction of feature sets which contain a wide range of spectral and spatial properties associated with an image. Accordingly, the output of the spatial filters (e.g., image features) may be used to form image descriptors for image representation.

It is understood that for multi-band applications, the image descriptor associated with each multi-band image is comprised of a series of individual image descriptors for each information band (e.g., color band) of the multi-band image. Further, the series of an individual image descriptors for each information band of a multi-band image may be represented as a single image descriptor containing the corresponding image description information for each information band of the multi-band image.

Accordingly, one type of oriented spatial filter used for extracting image features from images is the steerable filter, steerable filters obtain information about the response of a filter at any orientation (x,y) using a small set of basis filters. In one embodiment, $$x^2 \exp\left(\frac{x^2+y^2}{2*\sigma^2}\right)$$

is chosen as the kernel of the steerable filter.

Referring to FIG. 1, the first or base image [I1(x,y)] is applied to the steerable filter [Filter fθ(x,y)] at Block 100 which provides an image descriptor comprised of two different matrices for the base image [I1(x,y)], an orientation matrix and an energy matrix. The orientation matrix, also referred to as an Orientation Map Θ(I1(x,y)), is derived by computing the dominant orientation at each pixel position (x,y) by using the equation:

$$\Theta(x,y) = \frac{1}{2}\arctan\left[\frac{\sqrt{3}\,(E(60°)(x,y) - E(120°)(x,y))}{2E(0°) - E(60°) - E(120°)}\right]$$

Whereas, the energy matrix, also referred to as an Energy Map E (I1(x,y)), corresponds to the dominant orientation at each pixel position (x,y) in a dance with the equation:

$$E(x,y) = E(0°) + E(60°) + E(120°) + 2\sqrt{\begin{array}{l}E^2(0°) + E^2(60°) +\\ E^2(120°) -\\ E(0°)(E(60°) +\\ E(120°)) -\\ E(60°)E(120°)\end{array}}$$

As such, the filtering of the base image [I1(x,y)] using the steerable filter [Filter fθ(x,y)] results in the creation of a filtered base image f[I1(x,y)] comprising two different matrices, an Orientation Map Θ(I1(x,y)) and an Energy Map E (I1(x,y)).

Similarly, the second or illuminated base image [I2(x,y)], the illuminated base image [I2(x,y)] being an illuminated variation of the base image [I1(x,y)], is applied to the steerable filter [Filter fθ(x,y)] at Block 100, which provides an image descriptor comprised of two different matrices for the base image [I2(x,y)], an orientation matrix and an energy matrix. The orientation matrix, also referred to as an Orientation Map Θ(I2(x,y)), is derived by computing the dominant orientation at each pixel position (x,y) by using the equation:

$$\Theta(x,y) = \frac{1}{2}\arctan\left[\frac{\sqrt{3}\,(E(60°)(x,y) - E(120°)(x,y))}{2E(0°) - E(60°) - E(120°)}\right]$$

Whereas, the energy matrix, also referred to as an Energy Map E(I2(x,y)), corresponds to the dominant orientation at each pixel position (x,y) in accordance with the equation:

$$E(x,y) = E(0°) + E(60°) + E(120°) + 2\sqrt{\begin{array}{l}E^2(0°) + E^2(60°) +\\ E^2(120°) -\\ E(0°)(E(60°) +\\ E(120°)) -\\ E(60°)E(120°)\end{array}}$$

As such, the filtering of the illuminated base image [I2(x,y)] using the steerable filter [Filter fθ(x,y)] results in the creation of a filtered base image f[I2(x,y)] comprising two different matrices, an Orientation Map Θ(I2(x,y)) and an Energy Map E (I2(x,y)).

Accordingly, for each matrix or map (i.e., Orientation Map Θ(I(x,y)) and Energy Map E (I(x,y))), a corresponding histogram or set of histograms may be used to represent global information, along with a set of co-occurence matrices which may be used to represent local information. As such, the Orientation Map Θ(I(x,y)) may be represented as a corresponding orientation histogram H(Θ)) and set of orientation co-occurence matrices CΘ. Similarly, the Energy Map E (I(x,y)) may be represented as a corresponding energy histogram H(E) and set of energy co-occurence matrices CE. Therefore, each image may be represented by a corresponding orientation histogram H(Θ), a set of orientation co-occurence matrices CΘ), a corresponding energy histogram H(E), and a set of energy co-occurence matrices CE.

At Block 105, a standard reflectance model is employed to determine the ratio of illumination between the filtered base image f[I1(x,y)] and the filtered illuminated base image f[I2(x,y)]). The ratio of illumination is determined based upon the illumination effects ln(λ) associated with each image (i.e., illumination effects ln(λ) individually associated with the base image f[I1(x,y)] and the illuminated base image f[I2(x,y)]). Accordingly, an illumination matrix may be employed to determine an illumination function (M) based upon the ratio of illumination between the base image f[I1(x,y)] and the illuminated base image f[I2(x,y)]. In one embodiment, the illumination function (M) comprises a linear transformation function (M). The illumination function (M) defines the relationship between the images [I1(x,y)] and [I2(x,y)], and correspondingly, the relationship between filtered images f[I1(x,y)] and f[I2(x,y)]. Accordingly, the filtered images f[I1(x,y)] and f[I2(x,y)], which are derived from the images [I1(x,y)] and [I2(x,y)], respectively, are associated or related to each other in accordance to the following relationship:

$$f[I1(x,y)] = (M)*(f[I2(x,y)]).$$

In one embodiment, a 3×3 matrix may be employed to determine the illumination function (M) based upon the two illumination environments (e.g., illumination effects ln(λ)) of the images [I1(x,y)] and [I2(x,y)], but not on the surface properties of the object. Accordingly, under the assumption of narrow-band sensors, the illumination function (M) may be simplified into a diagonal matrix, wherein mi represents the diagonal elements of the illumination function (M), in accordance with the following relationship:

$$f[I1(x,y)] = \begin{bmatrix} m1 & \phi & \phi \\ \phi & m2 & \phi \\ \phi & \phi & m3 \end{bmatrix} * (f[I2(x,y)])$$

It is understood that for multi-band applications, the image descriptor associated with each multi-band image is comprised of a series of individual image descriptors for each information band (e.g., color band) of the multi-band image. Further, the series of an individual image descriptors for each information band of a multi-band image may be represented as a single image descriptor containing the corresponding image description information for each information band of the multi-band image.

Correspondingly, the individual information bands (i) associated with the filtered images f[I1(x,y)] and f[I2(x,y)] are associated with each other according to the following relationship:

$$fi[I1(x,y)] = (mi)*(fi[I2(x,y)]).$$

Next at Block 110, energy maps, E(f[I1(x,y)]) and E(f[I2(x,y)]) wherein E(f[I1(x,y)]=(M)*E(f[I2(x,y)]), are normalized. As f[I1(x,y)]=(M)*(f[I2(x,y)]), the energy matrices E(In(x,y)) associated with the respective filtered images, f[I1(x,y)] and f[I2(x,y)], are related according to the following relationship:

$$E(f[I1(x,y)]) = (M)*(E(f[I2(x,y)])).$$

Accordingly, the energy components of the respective filtered images, f[I1(x,y)] and f[I2(x,y)], are normalized by dividing the energy matrices E(In(x,y)) relationship above {i.e., E (f[I1(x,y)])=(M)*(E(f[I2(x,y)]))} by a primary energy relationship, wherein the primary energy matrices relationship is E (f[I1(0,0)])=(M)*(E(f[I2(0,0)])).

Accordingly, the normalized filtered images, f[I1(x,y)] and f[I2(x,y)], are normalized according to the following relationship:

$$\frac{E(f[I1(x,y)])}{E(f[I1(0,0)])} = \frac{(M)*(E(f[I2(x,y)]))}{(M)*(E(f[I2(0,0)]))}$$

Accordingly, based upon the energy matrices relationship above, the illumination function (M) is effectively cancelled or removed, such that the illumination effects ln(λ) associated with or otherwise acting on the respective images I1(x,y) and I2(x,y) is effectively cancelled or removed. The removal or cancellation of the illumination function (M) provides the following relationship between the energy matrices of the respective filtered images of f[I1(x,y)] and f[I2(x,y)]:

$$\frac{E(f[I1(x,y)])}{E(f[I1(0,0)])} = \frac{(E(f[I2(x,y)]))}{(E(f[I2(0,0)]))}$$

As f[I1(x,y)]=(M)*(f[I2(x,y)]), the orientation matrices Θ(In(x,y)) associated with the respective filtered images, f[I1(x,y)] and f[I2(x,y)], are related according to the following relationship:

$$\Theta(f[I1(x,y)]) = \Theta(f[I2(x,y)]),$$

wherein, $$\Theta(x,y) = \frac{1}{2}\arctan\left[\frac{\sqrt{3}\,(E(60°)(x,y) - E(120°)(x,y))}{2E(0°) - E(60°) - E(120°)}\right]$$

Accordingly, the orientation components of respective filtered images, f[I1(x,y)] and f[I2(x,y)], are not required to be normalized, as the illumination function (M) is effectively cancelled or removed by the relationship of the orientation matrices Θ(In(x,y)) associated with the respective filtered images, f[I1(x,y)] and f[I2(x,y)], as illustrated:

$$\frac{1}{2}\arctan\left[\frac{\sqrt{3}\,(E(60°)(x,y) - E(120°)(x,y))}{2E(0°) - E(60°) - E(120°)}\right] = \frac{1}{2}\arctan\left[\frac{\sqrt{3}\,(M*E(60°)(x,y) - M*E(120°)(x,y))}{2*M*E(0°) - M*E(60°) - M*E(120°)}\right]$$

Therefore, the orientation matrices Θ(In(x,y)) associated with the respective filtered images, f[I1(x,y)] and f[I2(x,y)], are related according to the following relationship:

$$\Theta(f[I1(x,y)]) = \Theta(f[I2(x,y)]).$$

As illustrated by the above relationship, the orientation matrices Θ(In(x,y)) associated with the respective filtered images, f[I1(x,y)] and f[I2(x,y)], are unaffected by the illumination effects associated with, or acting upon, each respective image (I1(x,y) and I2(x,y)).

As such, the normalization technique that is applied to the energy matrices E(In(x,y)) associated with the respective filtered images, f[I1(x,y)] and f[I2(x,y)], does not have to be performed on the orientation matrices Θ(In(x,y)) associated with the respective filtered images, f[I1(x,y)] and f[I2(x,y)].

Accordingly, the normalized energy maps, E[I1(x,y)] and E[I2(x,y)], are capable of being compared to each other without being affected by the different illumination or illumination effects (e.g., I1(λ) and I2(λ)) acting on or associated with the common image or image surface (Ic). As such, the illuminated base image [I2(x,y)] is capable of being recognized as an illuminated variation of the base image [I1(x,y)] irrespective of the different illumination or illumination effects (e.g., I1(λ) and I2(λ)) acting on or associated with the common image or image surface (Ic).

Figure 2:
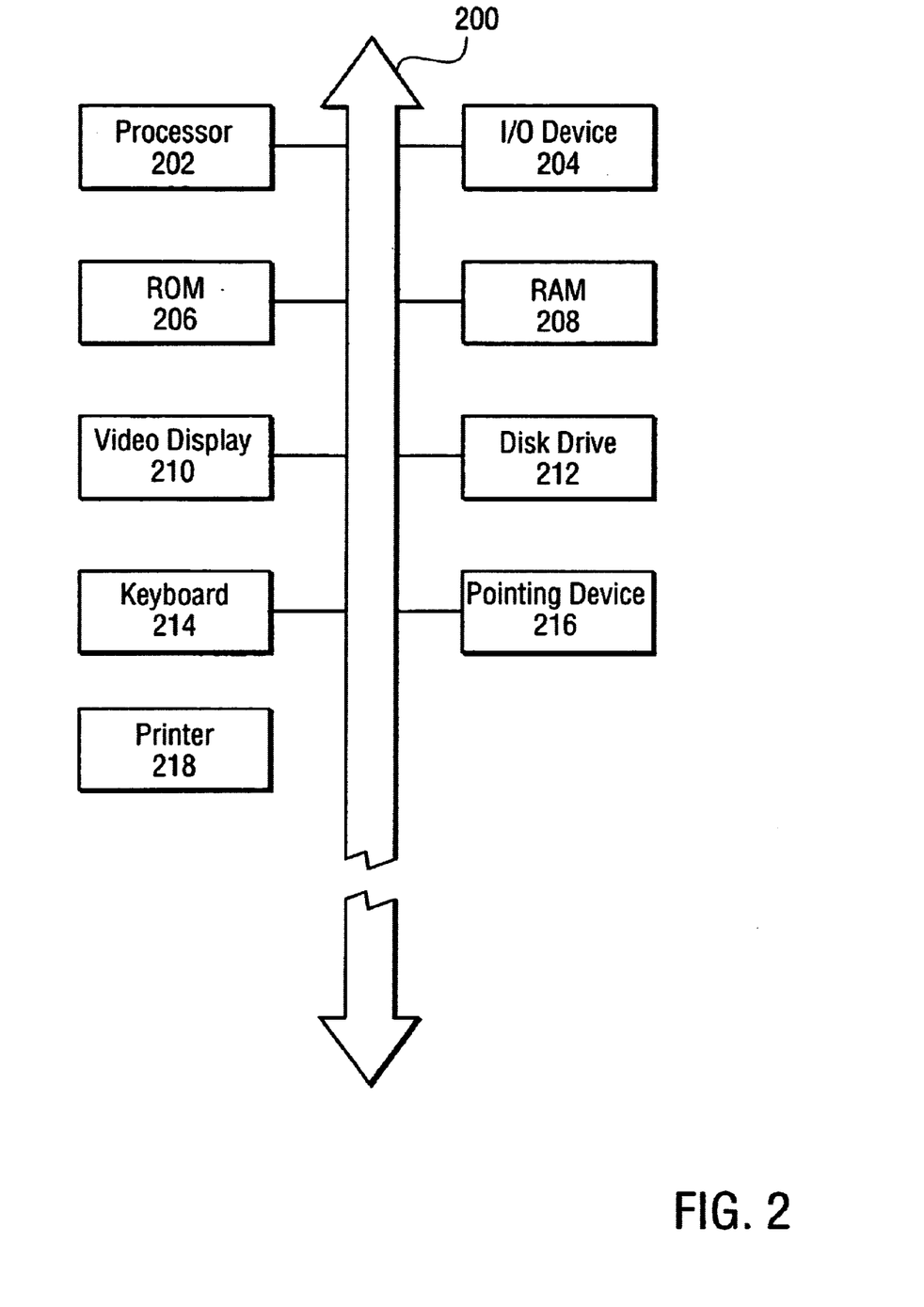
FIG. 2 illustrates an embodiment of a computer system which is capable of implementing the teachings of the present invention.

FIG. 2 illustrates an embodiment of a computer system that can be used with the present invention (e.g., as an image recognition system). The various components shown in FIG. 2 are provided by way of example. Certain components of the computer in FIG. 2 can be deleted from the image recognition system for a particular implementation of the invention. The computer shown in FIG. 2 may be any type of computer including a general purpose computer.

FIG. 2 illustrates a system bus 200 to which various components are coupled. A processor 202 performs the processing tasks required by the computer. Processor 202 may be any type of processing device capable of implementing the steps necessary to perform the addressing and delivery operations discussed above. An input/output (I/O) device 204 is coupled to bus 200 and provides a mechanism for communicating with other devices coupled to the computer. The input/output (I/O) device 204 also allows for data input and data output from the computer. A read-only memory (ROM) 206 and a random access memory (RAM) 208 are coupled to bus 200 and provide a storage mechanism for various data and information used by the computer. Although ROM 206 and RAM 208 are shown coupled to bus 200, in alternate embodiments, ROM 206 and RAM 208 are coupled directly to processor 202 or coupled to a dedicated memory bus (not shown).

A video display 210 is coupled to bus 200 and displays various information and data to the user of the computer. A disk drive 212 is coupled to bus 200 and provides for the long-term mass storage of information. Disk drive 212 may be used to store various profile data sets and other data generated by and used by the addressing and delivery system. A keyboard 214 and pointing device 216 are also coupled to bus 200 and provide mechanisms for entering information and commands to the computer. A printer 218 is coupled to bus 200 and is capable of creating a hard-copy of information generated by or used by the computer.

Figure 3:
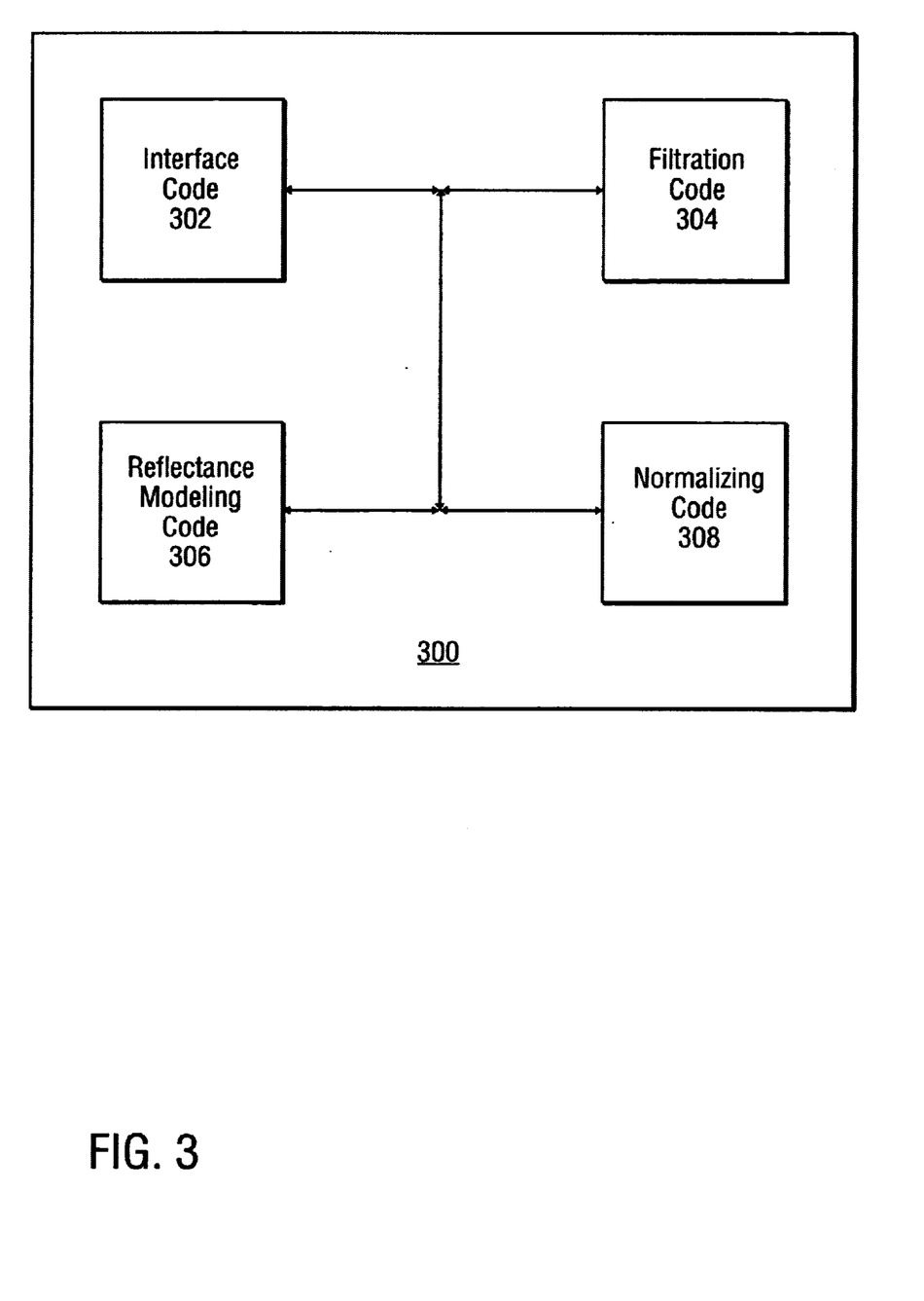
FIG. 3 illustrates an embodiment of a computer-readable medium which is capable of implementing the teachings of the present invention.

FIG. 3 illustrates an embodiment of a computer-readable medium 300 containing various sets of instructions, code sequences, configuration information, and other data used by a computer, processor, or other processing device. The embodiment illustrated in FIG. 3 is suitable for use with the computer system/image recognition system described above. The various information stored on medium 300 is used to perform various data processing operations. Computer-readable medium 300 is also referred to as a processor-readable medium. Computer-readable medium 300 can be any type of magnetic, optical, or electrical storage medium including a diskette, magnetic tape, CD-ROM, memory device, or other storage medium.

Computer-readable medium 300 includes interface code 302 that controls the flow of information between various devices or components in the image recognition system. Interface code 302 may control the transfer of information within a device (e.g., between the processor and a memory device), or between an input/output port and a storage device, or control the transfer of information from one device to another.

Computer-readable medium 300 also includes filtration code 304 used for extracting image features from images. In one embodiment, an image of a common object or surface of an object (Ic) illuminated by a spectral distribution I1(λ) is represented as a first image or base image [I1(x,y)]. Similarly, the image of the common object or surface (Ic) illuminated by a different spectral distribution I2(λ) is represented as a second or illuminated base image [I2(x,y)]. As such, the illuminated base image [I2(x,y)] is an illuminated variation of the base image [I1(x,y)] due to the different illumination or illumination effects (e.g., I1(λ) and I2(λ)) acting on or associated with the common image or image surface (Ic).

Image features that correspond to the respective images, [I1(x,y)] and [I2(x,y)], may be extracted from the respective images by the application of the respective images to filtration code 304. The application of multi-band images to filtration code 304 enables the construction of feature sets which contain a wide range of spectral and spatial properties associated with an image. Accordingly, the output of the filtration code 304 (e.g., image features) may be used to form image descriptors for image representation.

It is understood that for multi-band applications, the image descriptor associated with each multi-band image is comprised of a series of individual image descriptors for each information band (e.g., color band) of the multi-band image. Further, the series of an individual image descriptors for each information band of a multi-band image may be represented as a single image descriptor containing the corresponding image description information for each information band of the multi-band image.

Accordingly, the filtration code 304 may use a steerable filter as a model for extracting image features from the respective images, the steerable filter model may obtain information about the response of a filter at any orientation (x,y) using a small set of basis filter models. In one embodiment, $$x^2 \exp\left(-\frac{x^2+y^2}{2*\sigma^2}\right)$$

is chosen as the kernel of the steerable filter model.

The filtration code 304 applies the first or base image [I1(x,y)] to the steerable filter model [Filter fθ(x,y)], which provides an image descriptor comprised of two different matrices for the base image [I1(x,y)], an orientation matrix and an energy matrix. The orientation matrix, also referred to as an Orientation Map Θ(I1(x,y)), is derived by computing the dominant orientation at each pixel position (x,y) by using the equation:

$$\Theta(x, y) = \frac{1}{2}\arctan\left[\frac{\sqrt{3}\,(E(60°)(x, y) - E(120°)(x, y))}{2E(0°) - E(60°) - E(120°)}\right]$$

Whereas, the energy matrix, also referred to as an Energy Map E(I1(x,y)), corresponds to the dominant orientation at each pixel position (x,y) in accordance with the equation:

$$E(x, y) = \overline{E(0°) + E(60°) + E(120°) + 2\sqrt{E^2(0°) + E^2(60°) + E^2(120°) - E(0°)(E(60°) + E(120°)) - E(60°)E(120°)}}$$

As such, the filtering of the base image [I1(x,y)] using the steerable filter [Filter fθ(x,y)] results in the creation of a filtered base image f[I1(x,y)] comprising two different matrices, an Orientation Map Θ(I1(x,y)) and an Energy Map E (I1(x,y)).

Similarly, the filtration code 304 applies the second or illuminated base image [I2(x,y)], the illuminated base image [I2(x,y)] being an illuminated variation of the base image [I1(x,y)], is applied to the steerable filter model [Filter fθ(x,y)], which provides an image descriptor comprised of two different matrices for the base image [I2(x,y)], an orientation matrix and an energy matrix. The orientation matrix, also referred to as an Orientation Map Θ(I2(x,y)), is derived by computing the dominant orientation at each pixel position (x,y) by using the equation:

$$\Theta(x, y) = \frac{1}{2}\arctan\left[\frac{\sqrt{3}\,(E(60°)(x, y) - E(120°)(x, y))}{2E(0°) - E(60°) - E(120°)}\right]$$

Whereas, the energy matrix, also referred to as an Energy Map E (I2(x,y)), corresponds to the dominant orientation at each pixel position (x,y) in accordance with the equation:

$$E(x, y) = \overline{E(0°) + E(60°) + E(120°) + 2\sqrt{E^2(0°) + E^2(60°) + E^2(120°) - E(0°)(E(60°) + E(120°)) - E(60°)E(120°)}}$$

As such, the filtering of the illuminated base image [I2(x,y)] using the steerable filter model [Filter fθ(x,y)] results in the creation of a filtered base image f[I2(x,y)] comprising two different matrices, an Orientation Map Θ(I2 (x,y)) and an Energy Map E (I2(x,y)).

Accordingly, for each matrix or map (i.e., Orientation Map Θ(I(x,y)) and Energy Map E (I(x,y))), a corresponding histogram or set of histograms may be used to represent global information, along with a set of co-occurence matrices which may be used to represent local information. As such, the Orientation Map Θ(I(x,y)) may be represented as a corresponding orientation histogram H(Θ) and set of orientation co-occurence matrices CΘ. Similarly, the Energy Map E (I(x,y)) may be represented as a corresponding energy histogram H(E) and set of energy co-occurence matrices CE. Therefore, each image may be represented by a corresponding orientation histogram H(Θ)), a set of orientation co-occurence matrices CΘ, a corresponding energy histogram H(E), and a set of energy co-occurence matrices CE.

Next, reflectance modeling code 306, based upon a standard reflectance model, is employed to determine the ratio of illumination between the filtered base image f[I1(x,y)] and the filtered illuminated base image f[I2(x,y)]). The ratio of illumination is determined based upon the illumination effects ln(λ) associated with each image (i.e., illumination effects ln(λ) individually associated with the base image f[I1(x,y)] and the illuminated base image f[I2(x,y)]). Accordingly, an illumination function (M) is determined by the reflectance modeling code 306 based upon the ratio of illumination between the base image f[I1(x,y)] and the illuminated base image f[I2(x,y)]). In one embodiment, the illumination function (M) comprises a linear transformation function (M). The illumination function (M) defines the relationship between the images [I1(x,y)] and [I2(x,y)], and correspondingly, the relationship between filtered images f[I1(x,y)] and f[I2(x,y)]. Accordingly, the filtered images f[I1(x,y)] and f[I2(x,y)], which are derived from the images [I1(x,y)] and [I2(x,y)], respectively, are associated or related to each other in accordance to the following relationship:

$$f[I1(x,y)]=(M)*(f[I2(x,y)])$$

In one embodiment, a 3×3 matrix may be employed to determine the illumination function (M) based upon the two illumination environments (e.g., illumination effects ln(λ)) of the objects [I1(x,y)] and [I2(x,y)], but not on the surface properties of the objects [I1(x,y)] and [I2(x,y)]. Accordingly, under the assumption of narrow-band sensors, the illumination function (M) may be simplified into a diagonal matrix, wherein mi represents the diagonal elements of the illumination function (M), in accordance with the following relationship:

$$f[I1(x, y)] = \begin{bmatrix} m1 & \phi & \phi \\ \phi & m2 & \phi \\ \phi & \phi & m3 \end{bmatrix} * (f[I2(x, y)])$$

It is understood that for multi-band applications, the image descriptor associated with each multi-band image is comprised of a series of individual image descriptors for each information band (e.g., color band) of the multi-band image. Further, the series of an individual image descriptors for each information band of a multi-band image may be represented as a single image descriptor containing the corresponding image description information for each information band of the multi-band image.

Correspondingly, the individual information bands (i) associated with the filtered images f[I1(x,y)] and f[I2(x,y)] are associated with each other according to the following relationship:

$$fi[I1(x,y)]=(mi)*(fi[I2(x,y)]).$$

Next, the respective energy maps, E[I1(x,y)] and E[I2(x,y)], wherein E[I1(x,y)]=(M)*(f[I2(x,y)]), are normalized by normalization code 308. As f[I1(x,y)]=(M)*(f[I2(x,y)]), the energy matrices E(In(x,y)) associated with the respective filtered images, f[I1(x,y)] and f[I2(x,y)], are related according to the following relationship:

$$E(f[I1(x,y)])=(M)*(E(f[I2(x,y)])).$$

Accordingly, the energy components of the respective filtered images, f[I1(x,y)] and f[I2(x,y)], are normalized via the normalization code 308 by dividing the energy matrices E(In(x,y)) relationship above {i.e., E (f[I1(x,y)])=(M)*(E (f[I2(x,y)]))} by a primary energy relationship, wherein the primary energy matrices relationship is E (f[I1(0,0)])=(M) *(E(f[I2(0,0)])). Accordingly, the normalized filtered images, f[I1(x,y)] and f[I2(x,y)], are normalized according to the following relationship:

$$\frac{E(f[I1(x, y)])}{E(f[I1(0, 0)])} = \frac{(M)*(E(f[I2(x, y)]))}{(M)*(E(f[I2(0, 0)]))}$$

Accordingly, based upon the energy matrices relationship above, the illumination function (M) is effectively cancelled or removed, such that the illumination effects ln(λ) associated with or otherwise acting on the respective images I1(x,y) and I2(x,y) effectively cancelled or removed. The removal or cancellation of the illumination function (M) provides the following relationship between the energy matrices of the respective filtered images of f[I1(x,y)] and f[I2(x,y)]:

$$\frac{E(f[I1(x, y)])}{E(f[I1(0, 0)])} = \frac{(M)*(E(f[I2(x, y)]))}{(M)*(E(f[I2(0, 0)]))}$$

As f[I1(x,y)]=(M)*(f[I2(x,y)]), the orientation matrices Θ(In(x,y)) associated with the respective filtered images, f[I1(x,y)] and f[I2(x,y)], are related according to the following relationship:

$$\Theta(f[I1(x,y)]) = \Theta(f[I2(x,y)]),$$

wherein, $$\Theta(x, y) = \frac{1}{2} \arctan\left[\frac{\sqrt{3}\,(E(60°)(x, y) - E(120°)(x, y))}{2E(0°) - E(60°) - E(120°)}\right]$$

Accordingly, the orientation components of respective filtered images, f[I1(x,y)] and f[I2(x,y)], are not required to be normalized by normalization code 308, as the illumination function (M) is effectively cancelled or removed by the relationship of the orientation matrices Θ(In(x,y)) associated with the respective filtered images, f[I1(x,y)] and f[I2(x,y)], as illustrated:

$$\frac{1}{2} \arctan\left[\frac{\sqrt{3}\,(E(60°)(x, y) - E(120°)(x, y))}{2E(0°) - E(60°) - E(120°)}\right] =$$

$$\frac{1}{2} \arctan\left[\frac{\sqrt{3}\,(M^*E(60°)(x, y) - M^*E(120°)(x, y))}{2^*M^*(0°) - M^*E(60°) - M^*E(120°)}\right]$$

Therefore, the orientation matrices Θ(In(x,y)) associated with the respective filtered images, f[I1(x,y)] and f[I2(x,y)], are related according to the following relationship:

$$\Theta(f[I1(x,y)]) = \Theta(f[I2(x,y)]).$$

As illustrated by the above relationship, the orientation matrices Θ(In(x,y)) associated with the respective filtered images, f[I1(x,y)] and f[I2(x,y)], are unaffected by the illumination effects associated with, or acting upon, each respective image (I1(x,y) and I2(x,y)).

As such, the normalization technique that is applied by normalization code 308 to the energy matrices E(In(x,y)) associated with the respective filtered images, f[I1(x,y)] and f[I2(x,y)], does not have to be performed on the orientation matrices Θ (In(x,y)) associated with the respective filtered images, f[I1(x,y)] and f[I2(x,y)].

Accordingly, the normalized energy maps, E[I1(x,y)] and E[I2(x,y)], are capable of being compared to each other without being affected by the different illumination or illumination effects (e.g., I1(λ) and I2(λ)) acting on or associated with the common image or image surface (Ic). As such, the illuminated base image [I2(x,y)] is capable of being recognized as an illuminated variation of the base image [I1(x,y)] irrespective of the different illumination or illumination effects (e.g., I1(λ) and I2(λ)) acting on or associated with the common image or image surface (Ic).

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of manipulating illumination effects associated with an image, the method comprising:

filtering image data of an object to provide orientation data and energy data for a base image and an illuminated base image, the illuminated base image being a illuminated variation of the base image;

generating an illumination function based upon illumination difference between the filtered base image and the filtered illuminated base image, the energy data of the filtered illuminated base image being related to the energy data of the filtered base image by the illumination function;

normalizing the energy data of the filtered base image using a primary energy data relationship between the filtered base image and the filtered illuminated base image; and normalizing the energy data of the filtered illuminated base image using the primary energy data relationship, wherein the energy data of the filtered base image and the energy data of the filtered illuminated base image are normalized to remove the illumination difference between the filtered base image and the filtered illuminated base image.

2. The method of claim 1, wherein normalizing the energy data of the filtered base image comprises:

dividing the energy data of the filtered base image by the primary energy data relationship to create a normalized base image energy data ratio.

3. The method of claim 2, wherein normalizing the energy data of the filtered illuminated base image comprises:

dividing the energy data of the filtered illuminated base image by the primary energy data relationship to create a normalized illuminated base image energy data ratio.

4. The method of claim 3, wherein the normalized base image energy data ratio is set equal to the normalized illuminated base image energy data ratio such that the illumination difference between the filtered base image and the filtered illuminated base image is negated.

5. The method of claim 1, wherein the image data is applied to spatial filters to provide for the orientation data and the energy data for the base image and the illuminated base image.

6. The method of claim 1, wherein the illumination function is determined according to an illumination matrix.

7. The method of claim 6, wherein the illumination matrix is determined using a standard reflectance model.

8. The method of claim 6, wherein the illumination matrix comprises a diagonal matrix.

9. The method of claim 1, wherein the illumination function comprises a linear transformation function.

10. The method of claim 1, wherein the orientation data associated with the filtered base image and the filtered illuminated base image are unaffected by the illumination difference between the filtered base image and the filtered illuminated base image.

11. A machine readable medium containing executable instructions which, when executed in a processing system, causes the processing system to perform the steps of a method for manipulating illumination effects associated with an image, the method comprising:

filtering image data of an object to provide orientation data and energy data for a base image and an illuminated base image, the illuminated base image being a illuminated variation of the base image;

generating an illumination function based upon illumination difference between the filtered base image and the filtered illuminated base image, the energy data of the filtered illuminated base image being related to the energy data of the filtered base image by the illumination function;

normalizing the energy data of the filtered base image using a primary energy data relationship between the filtered base image and the filtered illuminated base image; and normalizing the energy data of the filtered illuminated base image using the primary energy data relationship, wherein the energy data of the filtered base image and the energy data of the filtered illuminated base image are normalized to remove the illumination difference between the filtered base image and the filtered illuminated base image.

12. The machine readable medium of claim 11, wherein normalizing the energy data of the filtered base image comprises:

dividing the energy data of the filtered base image by the primary energy data relationship to create a normalized base image energy data ratio.

13. The machine readable medium of claim 12, wherein normalizing the energy data of the filtered illuminated base image comprises:

dividing the energy data of the filtered illuminated base image by the primary energy data relationship to create a normalized illuminated base image energy data ratio.

14. The machine readable medium of claim 13, wherein the normalized base image energy data ratio is set equal to the normalized illuminated base image energy data ratio such that the illumination difference between the filtered base image and the filtered illuminated base image is negated.

15. The machine readable medium of claim 11, wherein the image data is applied to a spatial filter model to provide for the orientation data and the energy data for the base image and the illuminated base image.

16. The machine readable medium of claim 11, wherein the illumination function is determined according to an illumination matrix.

17. The machine readable medium of claim 16, wherein the illumination matrix is determined using a standard reflectance model.

18. The machine readable medium of claim 16, wherein the illumination matrix comprises a diagonal matrix.

19. The machine readable medium of claim 11, wherein the illumination function comprises a linear transformation function.

20. The machine readable medium of claim 11, wherein the orientation data associated with the filtered base image and the filtered illuminated base image are unaffected by the illumination difference between the filtered base image and the filtered illuminated base image filtered image.

21. A system comprising:

a memory;

a processor coupled to the memory, said processor configured to filter image data of an object to provide orientation data and energy data for a base image and an illuminated base image, the illuminated base image being a illuminated variation of the base image, generate an illumination function based upon illumination difference between the filtered base image and the filtered illuminated base image, the energy data of the filtered illuminated base image being related to the energy data of the filtered base image by the illumination function, normalize the energy data of the filtered base image using a primary energy data relationship between the filtered base image and the filtered illuminated base image, and normalize the energy data of the filtered illuminated base image using the primary energy data relationship, wherein the energy data of the filtered base image and the energy data of the filtered illuminated base image are normalized to remove the illumination difference between the filtered base image and the filtered illuminated base image.

* * * * *